United States Patent [19]

Gookin

[11] Patent Number: 4,784,473
[45] Date of Patent: Nov. 15, 1988

[54] FERROELECTRIC OPTICAL SWITCHING

[75] Inventor: Debra M. Gookin, San Diego, Calif.

[73] Assignee: United States of America as represented by the Secretary of the Navy, Washington, D.C.

[21] Appl. No.: 20,627

[22] Filed: Mar. 2, 1987

[51] Int. Cl.[4] .......................... G02F 1/01; G02F 1/03; G02F 1/19; G02B 5/30

[52] U.S. Cl. ................... 350/355; 350/392; 350/393; 350/389; 350/3.64; 372/21

[58] Field of Search ............ 350/354, 355, 393, 392, 350/3.64, 389; 372/21

[56] References Cited

U.S. PATENT DOCUMENTS

| | | | |
|---|---|---|---|
| 3,069,973 | 12/1962 | Ames | 88/61 |
| 3,393,954 | 7/1968 | Enderby et al. | 350/150 |
| 3,503,668 | 3/1970 | Domenico, Jr. et al. | 350/150 |
| 3,900,246 | 8/1975 | Kimura et al. | 350/150 |
| 4,041,477 | 8/1977 | Drenckhan | 350/392 |
| 4,063,795 | 12/1977 | Huignard et al. | 350/3.64 |
| 4,157,660 | 6/1979 | Marcatili | 350/96.14 |
| 4,204,116 | 5/1980 | Cresswell et al. | 350/355 |
| 4,505,536 | 3/1985 | Huignard et al. | 350/3.64 |
| 4,508,431 | 4/1985 | Henshaw | 350/355 |
| 4,576,434 | 3/1986 | Huignard et al. | 350/3.64 |
| 4,586,779 | 5/1986 | Huignard et al. | 350/3.64 |

Primary Examiner—Eugene R. Laroche
Assistant Examiner—Michael Shingleton
Attorney, Agent, or Firm—Ervin F. Johnston; Harvey Fendelman

[57] ABSTRACT

A switchable optical element uses solution grown barium titanate or other photorefractive ferroelectric to selectively switch the power from a first light beam to a second light beam. A polarity reversible electric field is applied to electrodes on the crystal. Light beams each with a component that is orthogonal to the crystal c axis are passed through the crystals. By selectively reversing the polarity of the electric field, the switching of the power from one of the light beams to the other light beams is accomplished.

17 Claims, 4 Drawing Sheets

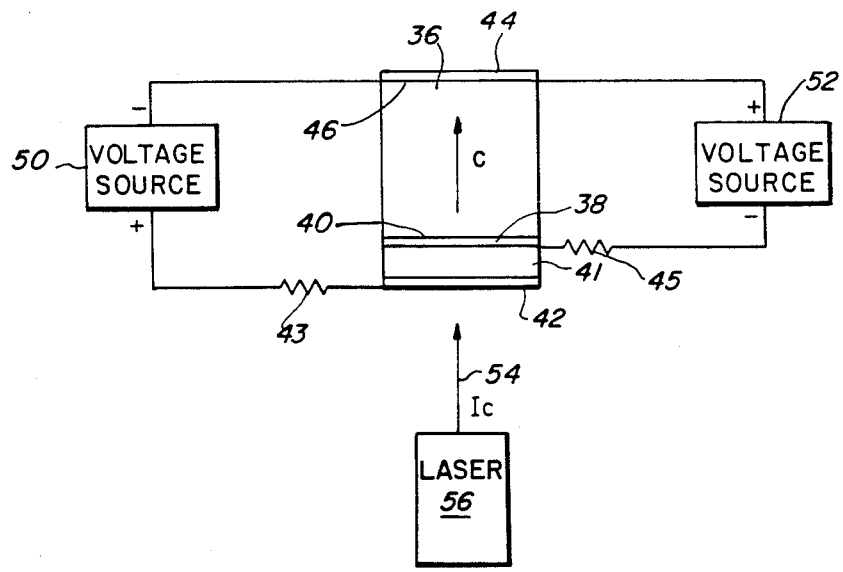
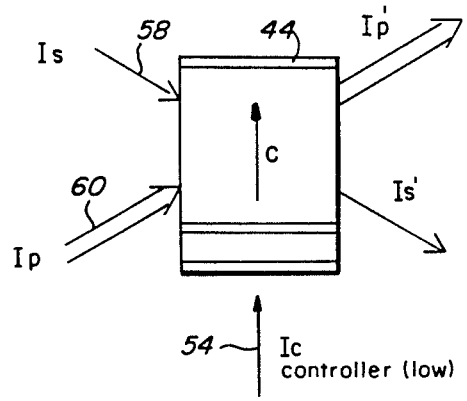
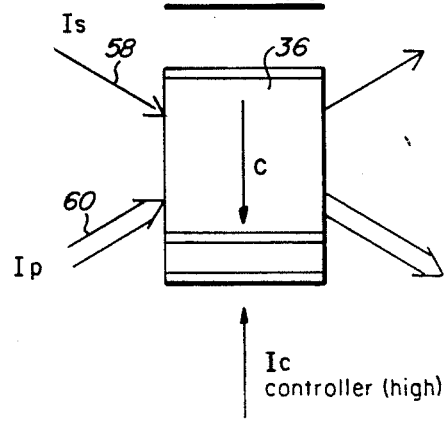

FERROELECTRIC OPTICAL SWITCHING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of switching and, more particularly, to the field of optical switching. Still more specifically, the invention is related to optical switching using ferroelectric materials.

Optical processing is an alternative to electronic systems for situations where electronics do not provide sufficient processing speeds. The fastest electronic sytems have maximum data rates of ten gigabits per second. Fast optical devices operating on many signals in parallel offer vast improvements in several areas of interest including sonar and radar surveillance, electronic warface and communications.

Ferroelectric crystals are common elements in optical processing sytems. This invention is particularly relevant to high speed optical communications switching, as in diverting a signal from one optical fiber to another. Several ferroelectric crystals, such as lithium niobate, potassium tantalate niobate, lithium tantalate, strontium barium niobate, and barium titanate, are photorefractive. Barium titanate has an unusually large electro-optic coefficient which has been effectively used to attain large nonlinear gain in two and four wave mixing configurations for beam coupling and optical phase configuration. The direction of nonlinear optical gain in a ferroelectric crystal is parallel or antiparallel (dependent on dominant carrier mobilities) to its ferroelectric c crystal axis. A property of ferroelectrics is that the direction of the c crystal axis can be repeatedly reversed by an externally applyed electric field. The direction of the net spontaneous polarization of the ferroelectric crystal is the c axis.

SUMMARY OF THE INVENTION

In accordance with present invention, the capability of repeatedly reversing the c crystal axis of a barium titanate or other ferroelectric crystal is utilized in conjunction with the photorefractive effect, to switch information and optical power between coupled beams. The present invention operates on the theory that optical gain is dependent on the alignment of the ferroelectric domains in the crystal and that domain size can be controlled through the application of electric fields. The barium titanate or other crystal is used as a gain medium for photorefractive beam coupling. An electric field having a magnitude at or near the coercive field of the crystal at the operating temperature is applied via electrodes on the crystal faces which have planes perpendicular to the c crystal axis. When the direction of the electric field is reversed, the direction of photorefractive beam coupling gain is also reversed.

In the case of two beam coupling, the effect of gain reversal is to increase the intensity of one beam at the expense of the other and to transfer information preferentially between beams. In one embodiment of the present invention, two dimensional spatial information is encoded on the signal beam. The direction of the amplified signal beam is then switched between two possible directions, as into one of two optical fibers.

In the case of multiple beam configurations, such as four wave mixing, the effect of gain reversal is more complicated. The simplest consequence of gain reversal by ferroelectric switching on four wave mixing is that the nonlinear mirror reflectivity, R, can be switched from $R>>$ to $R<1$. In other words, the amplitude of the phase conjugate signal can be controlled. In the switched case, the phase conjugate signal is very weak, and the transmitted intensity of the pump beams is increased. The information on the phase conjugate beam is a convolution of the information in the two pump beams with the signal beam.

The present invention brings together the ferroelectric and nonlinear optical properties of barium titanate and other photorefractive ferroelectrics to create a device with large swtichable optical gain for space and time domain processes. In addition to barium titanate within the scope of the present invention other photorefractive ferroelectrics such as potassium tantalate niobate (KTN), strontium barium niobate (SBN), lithium tantalate (LiTaO$_3$) and lithium niobate (LiNbO$_3$) can be used.

The magnitude of the nonlinear gain of the photorefractive ferroelectric is determined by the ferroelectric state of the crystal. Barium titanate is a member of the perovskite class of ferroelectrics which have 3 possible domain orientational axes, only one of which is of use for optical swithcing. The others can lead to crystal fracture through the creation of perpendicular strains. Another ferroelectric class, the tungsten-bronzes, has only one orientational axis so they are easier to pole at room temperature than perovskites. Therefore, photorefractive ferroelectrics of the tungsten-bronze classs, such as strontium barium niobate may be better materials for ferroelectric optical switching. The chioce of the appropriate photorefractive ferroelectric for a given application depends on the preference of using a large gain material, or using one with less orientational degrees of freedom in order to eliminate some soures of alignment error.

OBJECTS OF THE INVENTION

Accordingly, it is the primary object of the present invention to disclose a new switching process using barium titanate and other photorefractive ferroelectrics as switchable optical elements. It is a further object of the present invention to disclose an optical switch that can achieve swithcing speeds on the order of $10^6$ information bits within $\frac{1}{2}$ microsecond.

It is a still further object of the present invention to disclose a barium titanate optical switch that can replace passive elements in optical signal processing systems.

These and other objects of the invention will beocme more readily apparent from the ensuing specification when taken with the language of the appended claims in conjunction with the attached drawings.

BRIEF DESCRIPTION OF THE DRAWINGS

FIG. 4A illustrates the present invention used as an optical bidirectional coupler where a control beam is used to cause switching.

FIGS. 4B and 4C illustrate respectively schematically, unswitched and switched beam intensities before and after electric field polarity reversal.

DESCRIPTION OF THE PREFERRED EMBODIMENT

Figure 1:
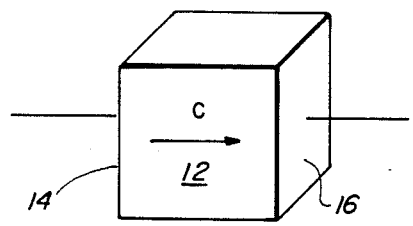
FIG. 1 is a schematic diagram of a barium titanate crystal.

Referring to FIG. 1, a barium titanate (BaTiO$_3$) crystal 12 is illustrated. The barium titanate crystal 12 is a high quality, solution grown barium titanate crystal and can be cube shaped as is illustrated and approximately several millimeters on each side. The barium titanate crystal 12 has electrodes 14 and 16 formed on opposet surface. The opposite surface are the c axis faces of the crystal 12 which are othogonal to the c axis of the crystal 12. The electrodes 14 and 16 may be comprised of conducting layers preferably of gold but may also comprise silver epoxy or any other suitable electrode material.

Figure 2A:
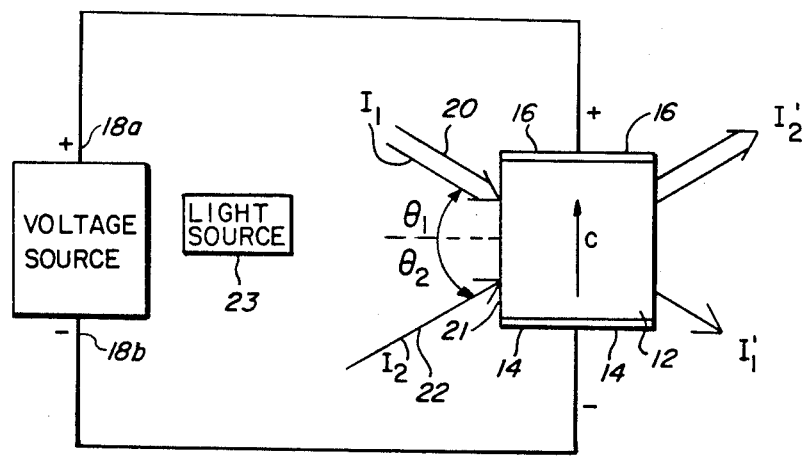
FIG. 2A is a schematic diagram of the barium titanate crystal of FIG. 1 illustrated, before switching, with two beams of light directed through the crystal and with an electric field applied to the crystal c axis faces.
Figure 2B:
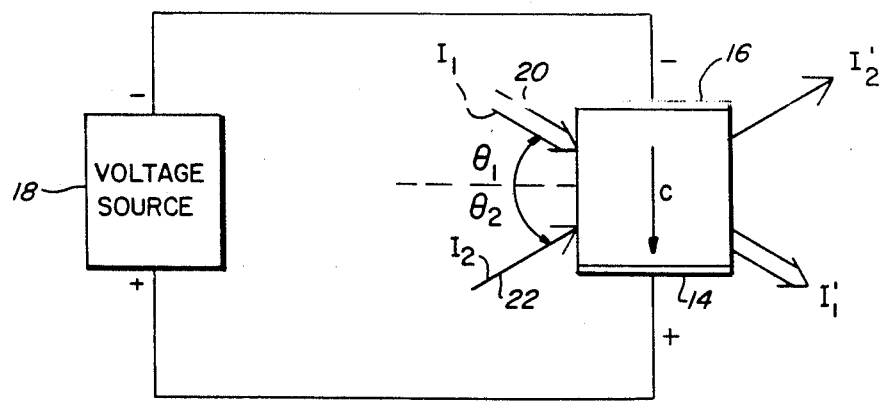
FIG. 2B is a schematic of the crystal of FIG. 2A showing switching of the beam intensities after polarity reversal of the electric field.

Referring to FIG. 2A, the barium titanate crystal 12 is placed in a circuit with switchable, bipolar high voltage source 18 connected to the electrodes 14 and 16 as illustrated. The voltage source 18 may be switched to change the polarity at its terminals 18a and 18b. In FIG. 2A terminal 18a is positive and 18b is negative. Further, a first beam of light 20 with intensity $I_1$ is directed through the barium titanate crystal at an angle $\theta_1$ with respect to crystal face 21 which is parallel to the c axis. Also, a second beam of light 22 with intensity $I_2$ is directed through the barium titanate crystal at an angle $\theta_2$ with respect to crystal face 21. The angles $\theta_1$ and $\theta_2$ may or may not be equal depending upon the application of the invention. Symmetrical switching of the light beams will result with equal angles $\theta_1$ and $\theta_2$ and symmetrical switching will result for unequal angles $\theta_1$ and $\theta_2$. The beams 20 and 22 may be generated by any suitable light source 23 which may, for example, be an argon ion or other laser used in conjunction with a beamsplitter and mirrors as described below and illustrated by way of example in FIG. 5. The beams 20 and 22 which may be, but need not be (depending on the application) equal intensity beams, pass through the barium titanate crystal such that some component of each beam direction is orthogonal to the c axis. In the embodiment illustrated in FIGS. 2A and 2B, beam 20 has a primary beam intensity greater than that of beam 22, i.e. $I_1 >> I_2$. Crystal 12 typically may be on the order of a 6 mm cube. The field strength created by voltage generator 18 may initially be set at or as nearly as possible at the coercive field lever of the crystal 12. Maximum efficiency may be achieved by experimentally varying the field strength. FIG. 2 illustrates that, before polarity reversal of the electric field applied across electrodes 14 and 16 from source 18, the properties of the crystal 12 spontaneous polarization is such that the light intensity from beams 20 and 22 is diverted almost entirely to beam 22 which emerges from the crystal with beam intensity $I_2' \approx I_1 + I_2$. FIG. 2B illustrates that after switching of the polarity from voltage source 18, the ferroelectric domains of the barium titanate crystal 12 are reoriented antiparallel to the original alignement and, therefore, the intensity of the beams 20 and 22 is "switched" to the beam 20. FIG. 2B thus illustrates that as beam 20 emerges from the crystal 12 its intensity is $I_1' \approx I_1 + I_2$. For the case where $I_1 >> I_2$, FIG. 2A illustrates that $I_2' >> I_1'$ and FIG. 2B illustrates that $I_1' >> I_2'$. On-off ratios of 500 to 1 can be readily achieved with optical switching in 100 microseconds with this technique.

Figure 3A:
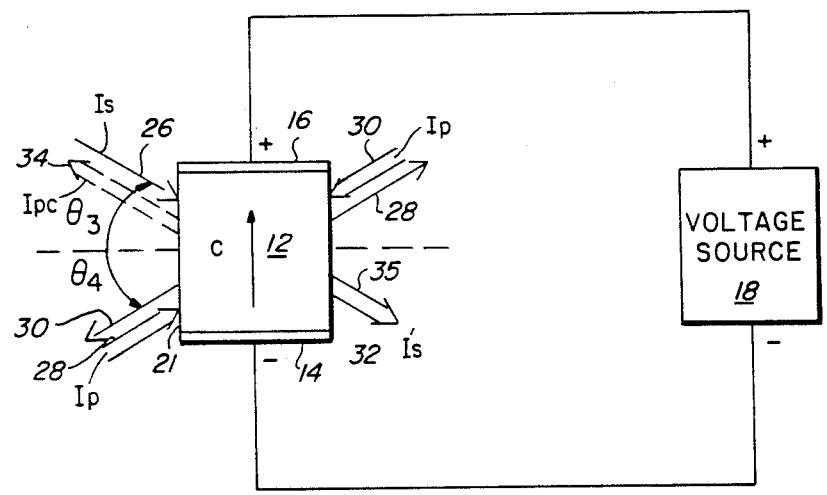
FIGS. 3A and 3B, respectively, are schematic diagrams of the crystal of FIG. 1 illustrated before switching and after switching showing the result on the generated phase conjugate signal in four wave mixing configuration.
Figure 3B:
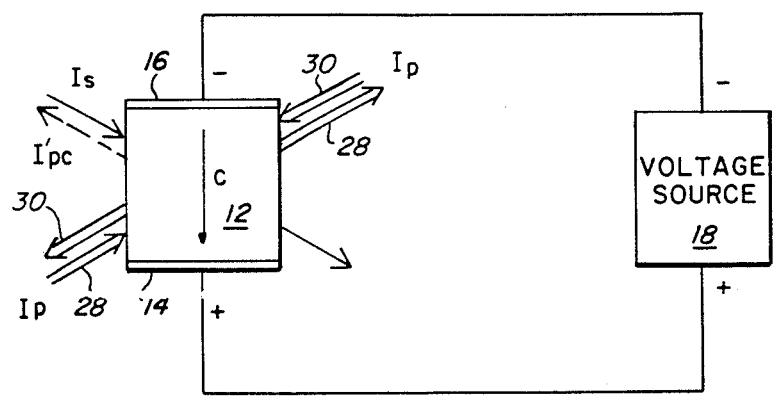

FIGS. 3A and 3B illustrate an alternate embodiment of the present invention where the invention is used in a four wave mixing configuration. In FIGS. 3A and 3B an input signal beam 26 having beam intensity $I_s$ shines through crystal face 21 and emerges with intensity $I_s'$. Beam 26 enters the crystal at angle $\theta_3$ as illustrated such that a component of the beam is orthogonal to face 21. Pump beams 28 and 30 enter the crystal at angle $\theta_4$ with respect to crystal faces 21 and 32, respectively, from opposite directions as illustrated in FIGS. 3A and 3B. The result of this four wave mixing configuration is the creation of the phase conjugate beam 34 illustraed in dash lines, which is parallel to but opposite in direction from beam 26 and which has intensity $I_{pc}$. It is understood that although illustrated as being side-by-side the beams 28 and 30 occupy the same space. Similarly, the beams 26 and 34 occupy the same space. As is described below, the present invention is used to externally control the appearance or disappearance of the phase conjugate beam. This technique may be used, for instance, in nonlinear reflectors.

FIG. 3A illustrates that before polarity reversal of the electric field applied across electrodes 14 and 16, the emerging beam 35 has beam lever intensity $I_s'$ and the phase conjugate beam has beam level intensity $I_{pc}$ where $I_{pc}/I_s' > 1$. In other words, the power of the pump beams 28 and 30 is switched to the emerging beam 35 and the phase conjugate beam 34. FIG. 3B illustrates that after polarity reversal of the electric field applied across electrodes 14 and 16, the phase conjugate beam has beam level intensity $I_{pc}'$ where $I_{pc}'/I_s < 1$, i.e. nearly all the power is switched to the pump beams 28 and 30 and little or none is switched to the phase conjugate beam 34. Thus by changing the field polarity from the voltage source 18, either a strong or weak phase conjugate beam 34 can be caused to result.

In the embodiment of the present invention illustrated in FIGS. 4A, 4B and 4C, the direction of gain of the ferroelectric, photorefractive crystal is controlled through the use of a control beam of light so that optical switching can be caused by changing the intensity of the control beam from high to low and vice versa. In FIG. 4A, the crystal 36 has a photoconductor 41 such as silicon (Si), gallium arsenide (GaAs), chromium (Cr), germanium (Ge), indium phosphide (InP), cadmium sulfide (CdS) or cadmium telluride (CdTe), in physical and electrical contact with electrode 38 which is in trun in physical and electrical contact with crystal c axis face 40. A second electrod 42 is in contact with the photoconductor on its exterior surface. A similar electrode 44 is put in physical and electrica contact with crystal c axis face 46. The thickness of the photoconductor 41 is selected such that its impedance is comparable to that of the ferroelectric, phototrefractive crystal 36. The actual thickness will depend on operating wavelengths, and bias voltage to be described as well as beam intensities. A first voltage supply 50 is connected with the polarity shown to electrodes 42 and 44 through current limiting resistor 43. A second voltage supply 52 is connected with the polarity shown to electrodes 38 and 44 through current limiting resistor 45. A control beam 54 from a suitable source such as laser 56 and having intensity $I_c$ is directed towards the photoconductor 41. As the laser 56 is switched on and off, the photoconductor switches alternately from high impedance to low impedance states. By way of example, the voltage supply 50 establishes an electric field on the order of $-2$ Kv/cm across the crystal 36 when the photoconductor 41 is in its high impedance state and on the order of $-4$ Kv/cm when the photoconductor is in its low impedance state in response to irradiation by beam 54. Voltage supply 52 establishes an electric field on the order of $+3$ Kv/cm across crystal 36. It can thus be appreciated in the present example, that when beam 54 is not irradiating photoconductor 41, photoconductor 41 has a high impedance state and the net electric field across crystal 36 is $+1$ Kv/cm in the direction indicated by the c axis arrow in FIG. 4A. When the beam 54 is irradiating photoconductor 41, it changes to its low impedance state and the net electric field across crystal 36 is $-1$ Kv/cm. This field reversal causes reversal of the c axis direction. FIGS. 4B and 4C illustrate schematically, respectively, low and high control beam conditions along with the concomitant c axis states. FIGS. 4B and 4C also illustrate how this c axis switching is used to switch power between two beams such as the signal and pump beams 58 and 60 having input beam intensities $I_s$ and $I_p$, respectively and output intensities $I_s'$ and $I_p'$. In FIG. 4B power is transferred from the signal beam 58 to the pump beam 60 such that pump beam output intensity $I_p'$ is amplified. This occurs when the control beam 54 intensity $I_c$ is low. In FIG. 4C power is transferred from the pump beam 60 to the signal beam 58 such that the signal beam output intensity $I_s'$ is amplified. This occurs when the control beam intensity is high. Such a scheme as illustrated in FIGS. 4A, 4B and 4C could be used in a fiber optic network of an amplification station to divert signals going from one fiber to another.

Figure 5:
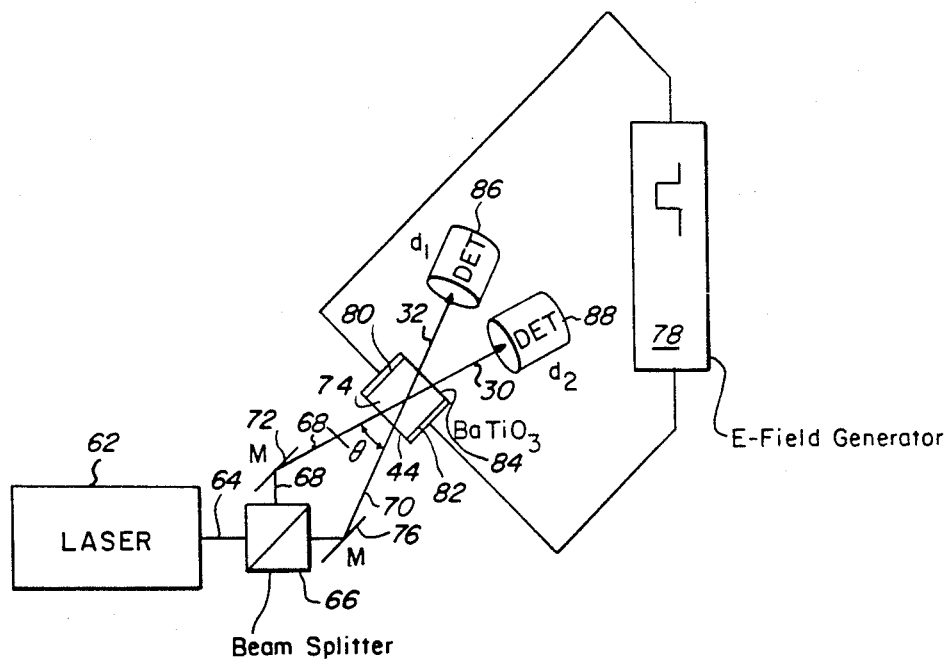
FIG. 5 is a schematic diagram of a two wave mixing configuration using a barium titanate switching element in accordance with the present invention.

Referring now to FIG. 5 there is illustrated a preferred embodiment of the present invention for accomplishing switching using a barium titanate crystal. In FIG. 5, laser beam generator 62, emits a beam of light 64. Laser generator 62 may comprise an argon ion or any oither laser generator that operates at a frequency at which the crystal that is being used is photorefractive. The beam of ligh 64 is directed into the front face of the beamsplitter 66 where it is divided into two equal intensity beams of light 68 and 70. A first mirror 72 directs beam 68 into the front face of barium titanate crystal 74. A second mirror 76 directs beam of light 70 into the front face of barium titanate crystal 74.

An electric field generator 78, which may comprise a bipolar high voltage supply, is connected to electrodes 80 and 82 which electrodes are on the c faces of the crystal 74. The E-field generator 78 may be an amplified analog signal source, an amplified binary signal source or any other suitable selectively switchable source of electric energy for applying an electric field across electrodes 80 and 82. The intensity of the beams 68 and 70 as they emerge from face 84 of the barium titanate crystal 74 may be detected by suitable optical detectors 86 and 88 which may comprise separate fiber optic bundles or any other suitable photodetectors.

When the E-field generator 78 is in a first state, or unswitched, the intensity of the beams 68 and 70 is switched by reason of the properties of the crystal 74 to the beam 68 such that virtually all of the intensity will be detected by detector 88 and such that detector 86 will detect virtually no intensity. Beam 68 is thus the high intensity beam and beam 70 is the low intensity beam. When the E-field generator 78 is switched to the other state to reverse the electric field across electrodes 80 and 82, the beam intensity is switched to the beam 70 such that beam 70 becomes the high intensity beam and such that beam 68 becomes the low intensity beam. This switch of beam intensities is thus detected by the detectors 86 and 88 and may be used for subsequent signal processing depending upon the particular application in which this invention is used.

Obviously, many modifications and variations of the present invention are possible in the light of the above teachings. It is therefore to be understood that within the scope of the appended claims the invention may be practiced otherwise than as spceifically described.

I claim:

1. An optical switch comprising:
   a photorefractive ferroelectric crystal having a c axis;
   first and second electrodes formed on opposing c axis faces of said crystal;
   means connected to said first and second electrodes for applying a polarity reversible electric field across said crystal and for selectively reversing said polarity;
   means for directing first and second beams of light through said crystal such that said first and second beams each have a component that is orthogonal to said c axis, whereby reversal of said electric field causes the power from said first beam of light to switch to said second beam of light 2. The optical switch of claim 1 wherein:
   said photorefractive ferroelectric crystal is solution grown barium titanate.

3. The switch of claim 1 wherein said means for directing comprises:
   means for generating a beam of light;
   a beamsplitter positioned to be irradiated by said beam of light and for splitting said beam of light into said first and second beams of light; and
   first and second mirrors postioned to reflect said first and second beams of light, respectively, through said crystal.

4. The switch of claim 3 wherein:
   said first and second beams of light are equal intensity beams of light.

5. The switch of claim 1 wherein:
   said first and second beams of light are equal intensity beams of light.

6. The switch of claim 1 wherein:
   said means for applying a polarity reversible electric field comprises a source of digital information.

7. The switch of claim 6 wherein:
   said means for applying a polarity reversible electric field comprises a source of analog information.

8. The switch of claim 1 wherein said means for applying a polarity reversible electric field comprises:
   a photoconductor in electrical contact with one of said first and second electrodes and being connected electrically in series with said crystal:
   control beam means for directing a control beam of light to irradiate said photoconductor and for selectively discontinuing the irradiation of said photoconductor.

9. The switch of claim 8 wherein said means for applying a polarity reversible electric field further comprises:
a first power supply connected across the series connection of said crystal and said photoconductor; and
a second power supply connected across said crytal.

10. The switch of claim 9 wherein:
said first and second power supplies are connected with opposite polarites.

11. An optical switch comprising:
a photorefractive ferroelectric crystal having a c-axis;
first and second electrodes formed on opposing c-axis faces of said crystal;
means connected to said first and second electrodes for applying a polarity reversible electric field across said crystal;
means for directing a first beam of light through said crystal such that said first beam of light has a component that is orthogonal to said c-axis;
means for directing first and second pump beams through said crystal in opposite directions such that, each of said first and second pump beams has a component that is orthogonal to said c-axis, and further such that there is created a phase conjugate beam that is parallel to but opposite indirection from said first beam and such that switching of said polarity reversible electric field causes switching of the power from said first and second pump beams to said phase conjugate beam.

12. An optical switch comprising:
a photorefractive ferroelectric crystal having a c-axis and opposing c-axis faces, and further having a coercive field lever associated therewith;
first and second electrodes formed on said opposing c-axis faces;
means connected to said first and second electrodes for applying a polarity reversible electric field across said crystal and for selectively reversing said polarity so as to reverse the direction of said c-axis;
means for directing first and second beams of light through said crystal such that said first and second beams each have a component that is orthogonal to said c-axis, whereby reversal of said electric field causes the power from said first beam of light to switch to said second bem of light.

13. An optical switch comprising:
a photorefractive ferroelectric crystal having a c-axis and opposing c-axis faces and further having a coercive field lever associated therewith;
first and second electrodes formed on said opposing c-axis faces;
means connected to said first and second electrodes for applying a polarity reversible electric field across said crystal and for selectively reversing said polarity so as to reverse the direction of said c-axis;
means for directing a first beam of ligth through said crystal such that said first beam of light has a component that is orthogonal to said c-axis;
means for directing first and second pump beams through said crystal in opposite directions such that, each of said first and second pump beams has a component that is orthogonal to said c-axis, and further such that there is created a phase conjugate beam that is parallel to but opposite in direction from said first beam and such that switching of said polarity reversible electric field causes switching of the power from said first and second pump beams to said phase conjugate beam.

14. The switch of claim 4 wherein:
the strength of said electric field is approximately at the coercive field level of said crystal.

15. The switch of claim 5 wherein:
the strength of said electric field is approximately at the coercive field level of said crystal.

16. The switch of claim 7 wherein:
the strength of said electric field is approximately at the coercive field level of said crystal.

17. The switch of claim 13 wherein:
the strength of said electric field is approximately at the coercive field level of said crystal.

* * * * *